United States Patent
Pitis et al.

(10) Patent No.: US 9,891,595 B2
(45) Date of Patent: Feb. 13, 2018

(54) SYSTEMS AND METHODS FOR OPERATING AN ENERGY-EFFICIENT DISPLAY

(71) Applicant: Fitbit, Inc., San Francisco, CA (US)

(72) Inventors: Andrei Pitis, Bucharest (RO); Iulian B. Vlad, Bucharest (RO); Ioan Deaconu, Mateesti (RO)

(73) Assignee: Fitbit, Inc., San Francisco, CA (US)

( * ) Notice: Subject to any disclaimer, the term of this patent is extended or adjusted under 35 U.S.C. 154(b) by 64 days.

(21) Appl. No.: 14/955,934

(22) Filed: Dec. 1, 2015

(65) Prior Publication Data

US 2017/0153606 A1 Jun. 1, 2017

(51) Int. Cl.
- *G04G 9/00* (2006.01)
- *G04G 19/12* (2006.01)
- *G09G 5/377* (2006.01)

(52) U.S. Cl.
CPC .......... *G04G 9/0005* (2013.01); *G04G 19/12* (2013.01); *G09G 5/377* (2013.01); *G09G 2330/021* (2013.01); *G09G 2360/08* (2013.01); *G09G 2360/121* (2013.01)

(58) Field of Classification Search
None
See application file for complete search history.

(56) References Cited

U.S. PATENT DOCUMENTS

| | | | |
|---|---|---|---|
| 5,363,483 A * | 11/1994 | Jones | G06T 15/40 345/619 |
| 7,176,864 B2 | 2/2007 | Moriyama et al. | |
| 8,378,945 B2 | 2/2013 | Harada | |
| 8,681,163 B2 | 3/2014 | Nakanishi et al. | |
| 8,751,194 B2 | 6/2014 | Panther et al. | |
| 8,768,648 B2 | 7/2014 | Panther et al. | |
| 8,878,771 B2 | 11/2014 | Sampsell | |
| 2001/0045943 A1 | 11/2001 | Prache | |
| 2009/0233705 A1* | 9/2009 | LeMay | G07F 17/32 463/25 |
| 2011/0044544 A1* | 2/2011 | Chen | G06K 9/468 382/190 |

(Continued)

OTHER PUBLICATIONS

Kenney ("Top Five Smartwatches with the Largest Displays", 2014, http://smartwatches.org/learn/top-five-smartwatches-with-the-largest-displays/).*

(Continued)

*Primary Examiner* — Kee M Tung
*Assistant Examiner* — Xin Sheng
(74) *Attorney, Agent, or Firm* — Weaver Austin Villeneuve & Sampson LLP

(57) ABSTRACT

Described systems and methods allow minimizing energy use and increasing battery life of a wearable device such as a smartwatch, by optimizing the way an image displayed to the user is updated in response to an event. In some embodiments, an image of each display object (e.g., clock hand, text, weather symbol, fitness icon) is individually stored in an image cache, such as a processor register or a separate section of memory. A new, updated on-screen image is computed dynamically, by combining cached images of the respective display objects. When the appearance of a current display object must change in response to the event, an updated image of the respective object is cached for future use.

20 Claims, 6 Drawing Sheets

(56) References Cited

U.S. PATENT DOCUMENTS

2012/0092246 A1* 4/2012 Choi .................. H04N 21/485
                                                          345/156
2014/0225817 A1  8/2014 Huang et al.
2014/0267645 A1* 9/2014 Wexler ................ G09B 21/006
                                                          348/62
2015/0084892 A1  3/2015 Shirota et al.

OTHER PUBLICATIONS

Green, "Programming Sharp's Memory LCDs", http://www.sharpmemorylcd.com/resources/Programming_Memory_LCDs_AppNote.pdf, Sharp Microelectronics of the Americas, Camas, WA, USA, Oct. 2010.

* cited by examiner

SYSTEMS AND METHODS FOR OPERATING AN ENERGY-EFFICIENT DISPLAY

BACKGROUND

The invention relates to systems and methods for operating a display device, and in particular to systems and methods for lowering the energy consumption associated with refreshing the display in wearable devices such as smartwatches and portable computing devices.

The functionality and performance of wearable and mobile computing devices are often limited by their size and positioning on the user's body (e.g., pocket, wrist, shoe). Since wearable devices are typically small and light, and therefore cannot accommodate a substantial power source, battery life further limits the user experience of such devices. Therefore, a significant effort is being directed towards improving the energy efficiency of portable and wearable devices. A particular area where energy savings can be made is the display. One conventional method of lowering the energy consumption of a display is to use energy efficient technologies such as memory liquid crystal (LCD) and/or electrophoretic ink displays, among others. Another set of techniques comprises dynamically switching the display on and off, for instance displaying information for short time intervals, or energizing the display only in response to certain user actions.

There is significant interest in developing wearable devices capable of delivering rich functionality and a pleasant user experience, in spite of inherent battery limitations.

SUMMARY

According to one aspect, a wearable computing device comprising a hardware processor, a display, and an image cache. The image cache stores a plurality of images, each image of the plurality of images comprising a rendering of an object. A first image of the plurality of images comprises a first set of values, each value of the first set of values indicative of a state of a pixel of a first object. The hardware processor is configured, in response to detecting an occurrence of an event, to compute a second image comprising a second set of values, each value of the second set indicative of a state of a pixel of a second object, and in response to computing the second image, to store the second image in the image cache. The hardware processor is further configured, in response to detecting the occurrence of the event, to retrieve from the image cache the first set of values. The hardware processor is further configured, in response to retrieving the first set of values, to combine the first set of values with the second set of values to produce a composite image, wherein combining the first set of values with the second set of values comprises determining a result of applying a pixel-wise logical operator to the first and second sets of values. The hardware processor is further configured, in response to producing the composite image, to transmit the composite image to the display.

According to another aspect, a method comprises employing a hardware processor of a wearable computing device, in response to detecting an occurrence of an event, to compute a first image comprising a first set of values, each value of the first set indicative of a state of a pixel of a first object. The method further comprises employing the hardware processor to store the first image in an image cache of the wearable computing device, the image cache further storing a plurality of images including a second image, the second image comprising a second set of values, each value of the second set indicative of a state of a pixel of a second object. The method further comprises, in response to detecting the occurrence of the event, employing the hardware processor to retrieve the second set of values from the image cache. The method further comprises employing the hardware processor to combine the first set of values with the second set of values to produce a composite image, wherein combining the first set of values with the second set of values comprises determining a result of applying a pixel-wise logical operator to the first and second sets of values. The method further comprises, in response to producing the composite image, transmitting the composite image to a display of the wearable computing device.

According to another aspect, a non-transitory computer readable medium stores instructions which, when executed by a hardware processor of a wearable computing device, cause the wearable computing device, in response to detecting an occurrence of an event, to compute a first image comprising a first set of values, each value of the first set indicative of a state of a pixel of a first object. The instructions further cause the hardware processor, in response to computing the first image, to store the first image in an image cache of the wearable computing device, the image cache further storing a plurality of images including a second image, the second image comprising a second set of values, each value of the second set indicative of a state of a pixel of a second object. The instructions further cause the hardware processor, in response to detecting the occurrence of the event, to retrieve from the image cache the second set of values. The instructions further cause the hardware processor, in response to retrieving the second set of values, to combine the first set of values with the second set of values to produce a composite image, wherein combining the first set of values with the second set of values comprises determining a result of applying a pixel-wise logical operator to the first and second sets of values. The instructions further cause the hardware processor, in response to producing the composite image, to transmit the composite image to a display of the wearable computing device.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding processor instructions usable to configure a processor to perform the methods described herein.

The following description illustrates embodiments of the invention by way of example and not necessarily by way of limitation.

Figure 1:
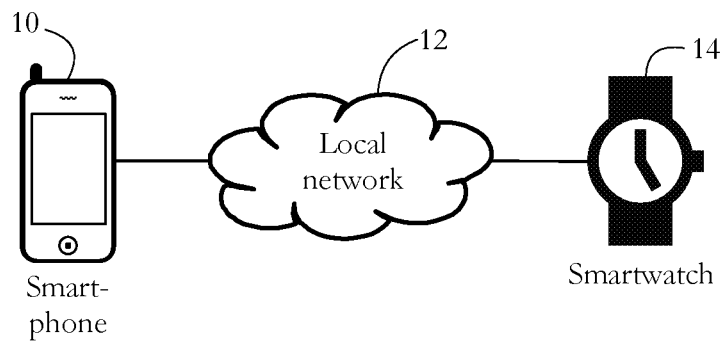
FIG. 1 shows an exemplary wearable device configuration wherein a smartwatch collaborates with a smartphone according to some embodiments of the present invention.

FIG. 1 shows an exemplary device configuration wherein a smartwatch 14 is communicatively coupled to a smartphone 10 according to some embodiments of the present invention. In some embodiments, smartphone 10 comprises a mobile computing device configured to communicate with a remote computing system over a telecommunication network. Data communicated by smartphone 10 may include, among others, an encoding of a user's voice, as occurring during a telephone conversation. Exemplary smartphones include mobile telephones and tablet computers, among others. Smartwatch 14 comprises an electronic appliance (e.g., wearable computing device) configurable to display the current time, among other information. Exemplary smartwatches 12 include wristwatches, fitness bands, and electronic jewelry, among others.

In some embodiments, smartwatch 14 and smartphone 10 are configured to execute a set of application programs, commonly known as apps. Apps may display information to a user of the respective device, for instance calendar events, messages, sports results, stock quotes, weather forecast, fitness indicators, and social media posts, among others. To obtain data required to generate the display, smartwatch 14 may need to connect to a remote server computer. To save energy, some embodiments lack the hardware to directly connect to an extended network such as the Internet. For instance, smartwatch 14 may not be able to directly connect to a cellular tower or to a wireless router. Instead, such embodiments may include a low-power communication device enabling smartwatch 10 to establish a proximity link with smartphone 10, and use smartphone 10's superior communication hardware for data transmission to and from a remote server computer. FIG. 1 shows such a configuration wherein smartwatch 14 is communicatively coupled to smartphone 10 via a local computer network 12, such as a BLUETOOTH® link, among others.

Figure 2:
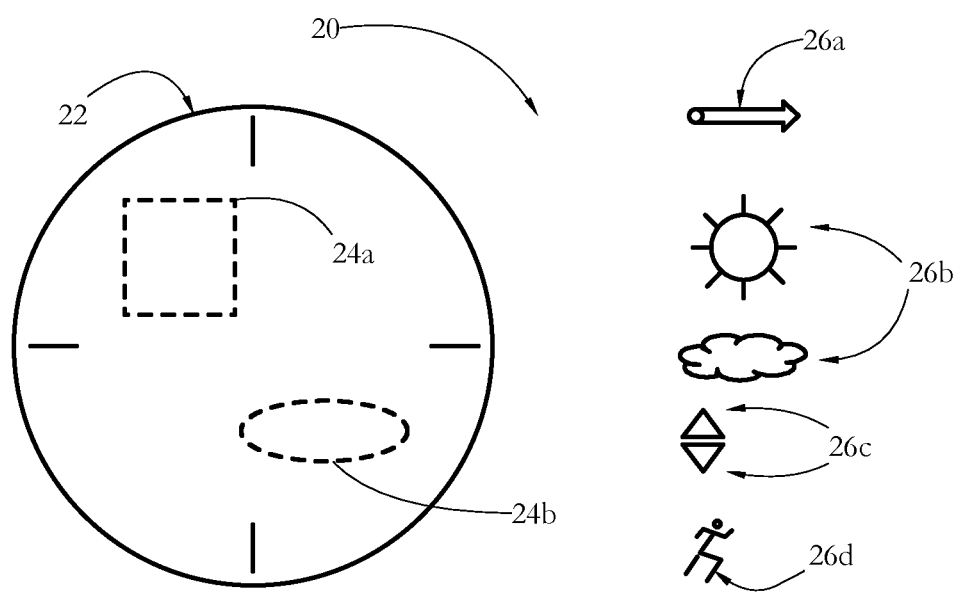
FIG. 2 illustrates exemplary components of a smartwatch template according to some embodiments of the present invention.

In some embodiments, smartwatch 14 uses a template to display data to the user. Such templates may be application-specific and/or customizable by the user of smartwatch 14. FIG. 2 illustrates exemplary components of a template 20. In some embodiments, template 20 represents a static part of an application, the static part pre-configured and delivered to smartwatch 14 as part of an application installation package. During execution of the respective application, the template is instantiated with dynamic content data received from smartphone 10. Exemplary dynamic content data may include message content (e.g., email), weather, stock, map, and fitness indicators, among others.

Template 20 may comprise a set of graphic symbols and a set of behaviors. Graphic symbols illustrated in FIG. 2 include a clock face 22, a clock hand 26a, a set of weather symbols 26b, a set of stock symbols 26c and a set of fitness symbols 26d. Other symbols may be used to represent email and/or social media messages, calendar events, etc. Template 20 may further include data defining a set of placeholders 24a-b. In some embodiments, each placeholder 24a-b represents a specific region of the display, as indicated for instance by a set of screen coordinates. Template 20 may be configured to display an image in each placeholder 24a-b, the respective image constructed according to dynamic content data. Such filling of placeholders 24a-b is herein referred to as instantiating template 20 with the respective content data. In some embodiments, instantiating template 20 with content data may further include selecting a graphic symbol (e.g., from among symbols 26a-d) according to content data received from smartphone 10, and displaying the respective symbol within the corresponding placeholder. In one such example, smartwatch 14 receives content data indicating that rain is imminent. In response to receiving the content data, template 20 selects a rain icon from weather symbols 26b, and displays the rain icon on the clock face, within an appropriate placeholder. In another example, smartwatch 14 detects that the user is currently running, and automatically switches to displaying a count of steps and/or a current heart rate (in the current example, template 20 is instantiated with the user's current heart rate and/or count of steps).

In some embodiments, template 20 is multi-layered, in the sense that its display elements may overlap in a pre-determined manner. For instance, a clock hand may occasionally occupy the same display region as a weather symbol. In one example, template 20 is configured so that weather symbols are always visible, i.e., when an overlap occurs, the respective weather symbol will obscure a part of the clock hand. In some embodiments, each graphic symbol of template 20 is pre-assigned to a layer. Multiple symbols may be assigned to the same layer. A first layer is said to lie above a second layer when a graphic symbol located in the first layer can at least partially obscure another graphic symbol located in the second layer. Some layers and/or symbols may be transparent at least in part, so that they allow some parts of a symbol located in a layer below to be visible.

Behaviors associated with template 20 may include a set of operations performed during rendering and/or instantiation of template 20, such as moving objects on screen (e.g., changing the position and orientation of clock hand 26a to indicate the current time), deciding whether and when to display certain graphic symbols, animating graphic symbols, etc. Other exemplary behaviors include a set of operations performed in response to detecting a user event (e.g., the user's pressing of a button, or a motion of the user).

Figure 3:
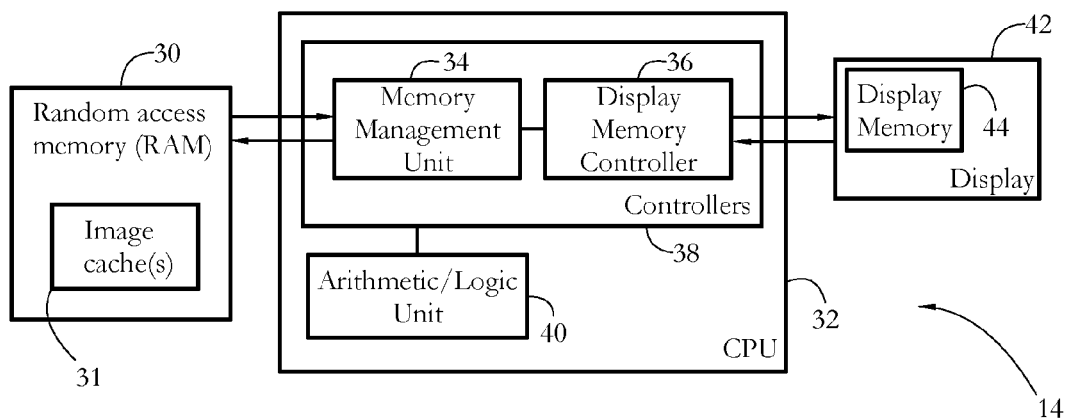
FIG. 3 shows exemplary hardware elements of a smartwatch according to some embodiments of the present invention.

FIG. 3 shows an exemplary hardware configuration of smartwatch 14 according to some embodiments of the present invention. The following description will use a wristwatch as an archetype. A skilled artisan will appreciate that the description may be adapted to other appliances such as wearable fitness monitors, tablet computers, electronic jewelry etc. For instance, the hardware configuration of other devices may differ slightly from the configuration illustrated in FIG. 3.

The exemplary hardware of FIG. 3 includes a central processing unit (CPU) 32, a random-access memory (RAM) 30, and a physical display 42 further comprising a display memory 44. The hardware components further comprise a set of controllers 38, such as a memory management unit (MMU) 34 and a display memory controller 36. In some embodiments such as system-on-a-chip configurations, some or all of the devices illustrated in FIG. 3 may be integrated into a common hardware device, for instance, an integrated circuit. Other hardware components of smartwatch 14, not pictured in FIG. 3, may include a power management controller and peripheral devices, such as a communication device allowing smartwatch 14 to establish a wireless connection with smartphone 10, and a set of sensors such as an ambient light sensor, accelerometer, ambient pressure sensor, etc.

CPU 32 comprises a hardware device (e.g., microprocessor, integrated circuit formed on a semiconductor substrate) configured to execute computational and/or logical operations with a set of signals and/or data. In some embodiments, an arithmetic-logic unit (ALU) 40, forming a part of CPU 32, is effectively carrying out arithmetic operations such as addition and multiplication, and logical operation such as NOT, AND, and OR. In some embodiments, such operations are encoded and delivered to CPU 32 in the form of a sequence of processor instructions (e.g. machine code or other type of software). RAM 30 represents volatile memory (e.g. DRAM) storing an encoding of such processor instructions and/or data/signals accessed or generated by CPU 32 in the course of carrying out instructions. MMU 34 is configured to enable and/or control access by CPU 32 to RAM 30 and to perform memory address translation.

In some embodiments, smartwatch 14 further comprises a set of image caches 31 comprising data storage components used to store images of display objects, as described below. In an exemplary embodiment, image caches 31 are logical caches forming a part of RAM 30, e.g., a section of memory reserved for storing images of display objects. Caches 31 may be divided in individual sections, each section (also referred to herein as an individual image cache) storing a distinct image of an object or an image of a distinct object. Such individual image caches may be uniquely identified by a memory address assigned to the respective cache by the operating system. In an alternative embodiment, image caches 31 are not part of RAM 30, but comprise a separate, dedicated memory bank. In yet another embodiment, image cache(s) 31 comprise hardware forming part of CPU 32, for instance a bank of processor registers configured to store image data.

Display 42 includes a physical device configurable to communicate visual information to the user of smartwatch 14. Display 42 may be embodied in any manner known in the art, for instance as a liquid crystal display—LCD, organic light-emitting diode array—OLED, electronic ink display, etc. In some embodiments, a display memory 44 stores an encoding (e.g., bitmap) of an image currently displayed to the user.

Display memory controller 36 ensures communication between CPU 32, RAM 30 and display memory 44. Such communication occurs, for instance, to write data to display memory 44, in order to render an image onto display 42. In a preferred embodiment, display memory controller 36 comprises a direct memory access (DMA) controller. Such controllers may be configured to perform memory access operations (e.g., write) independently and concurrently with CPU 32, for instance, on alternate bus cycles.

Figure 4:
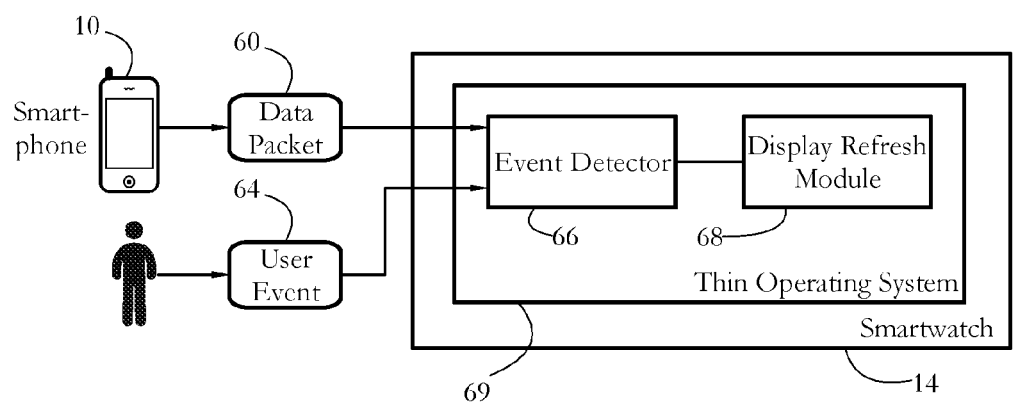
FIG. 4 shows exemplary software modules executing on the smartwatch according to some embodiments of the present invention.

FIG. 4 shows an exemplary set of software modules executing on smartwatch 14 according to some embodiments of the present invention. The shown software modules include an event detector 66 and a display refresh module 68 communicatively coupled to event detector 66. In some embodiments, event detector 66 is configured to detect the occurrence of an event causing a change in the image displayed to the user, and to communicate an indicator of the respective event to display refresh module 68. Module 68 is configured to refresh the image shown by display 42, as detailed further below.

Figure 5:
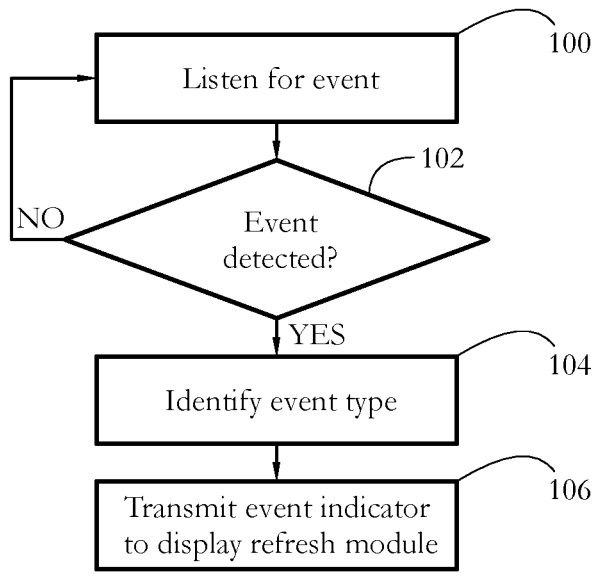
FIG. 5 illustrates an exemplary sequence of steps performed by an event detector of the smartwatch according to some embodiments of the present invention.

FIG. 5 illustrates an exemplary sequence of steps performed by event detector 66 according to some embodiments of the present invention. In a sequence of steps 100-102, event detector 66 listens for events and when an event is detected, in a step 104, event detector 66 identifies the event type. Exemplary event types include scheduled events, notifications, and user events. Scheduled events may comprise, for instance, events related to timekeeping and the display of the current time, as well as calendar events and animation events. In some embodiments, the display must be refreshed at regular time intervals (e.g., every minute, every second), for instance to update the position of a clock hand or to change a digit of a digital display. An internal clock of smartwatch 14 may generate an interrupt with a predetermined periodicity, e.g., at a predetermined count of clock ticks. The respective interrupt may be intercepted by detector 66 and interpreted as a timekeeping event. Animation events are associated with moving objects on the screen, for instance to transition between one mode of operation of smartwatch 14 and another, to transition between using one clock face and another, or to display animated symbols (emoticons, falling rain, etc.) Animation events may have an intrinsic timeline and/or a set of cues, which correspond to a set of progressive changes to the display. Therefore, animation events may use the same type of trigger (e.g., internal clock) as other scheduled events.

Notification events include receiving a data packet 60 via a communication interface of smartwatch 14. In a typical embodiment, such notifications come from smartphone 10, and include an indicator of dynamic content such as email, SMS, social network updates, sports scores, stock alerts, etc. User events 64 may include, for instance, the user's pressing of a button, or a movement of the watch. In one example, the user presses a button to request smartwatch 14 to switch to a specific state/operation mode (e.g., fitness mode, calendar mode, address book mode, etc.). In another user event example, smartwatch 14 may be configured to automatically detect that the user raises his/her wrist to look at the watch, and in response, to display the current time or other information. Such events may be intercepted by detector 66 via hardware interrupts generated by an accelerometer of smartwatch 14.

Figure 6:
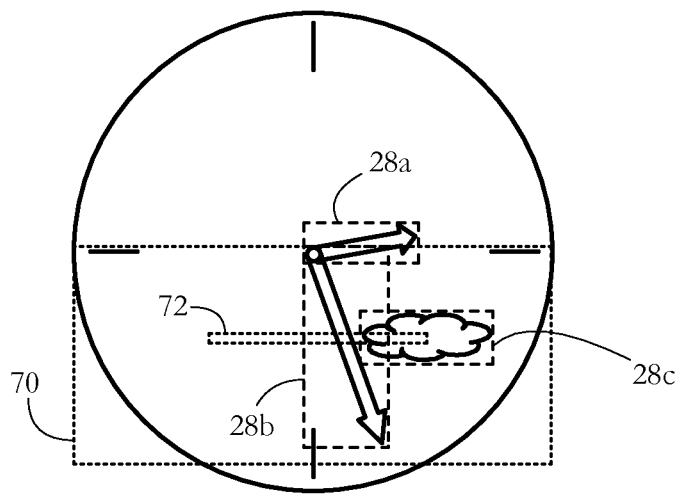
FIG. 6 shows a display region targeted for update, and a set display objects according to some embodiments of the present invention.

Events identified by event detector 66 cause smartwatch 14 to update/refresh at least a part of an image displayed to the user. For instance, the update rotates a clock hand, hides or reveals a symbol, displays some text, etc. FIG. 6 shows an exemplary situation, wherein the display must be refreshed to rotate the minute clock hand. Following the refresh, the old image of the minute hand must be erased, and a new, rotated image of the minute hand must be generated and drawn on screen. Such changes affect a specific target region 70 of the display. The size and location of target region 70 depend on the type of event (for instance, some events may erase/update the whole screen, while others may affect only a small region) and on hardware limitations. For instance, some versions of display 42 only allow writing one whole row/line of pixels at a time. FIG. 6 further shows a set of display objects 28a-c, including, in the current example, the hour hand, the minute hand, and a weather symbol. The term display object is used herein to denote a rendered instance of a graphic symbol of template 20 (including alterations of such symbols such as rotations and deformations, changes of color or transparency, etc.) and/or a rendered text. Each display object may have an associated screen position, such as a set of display coordinates.

Figure 7:
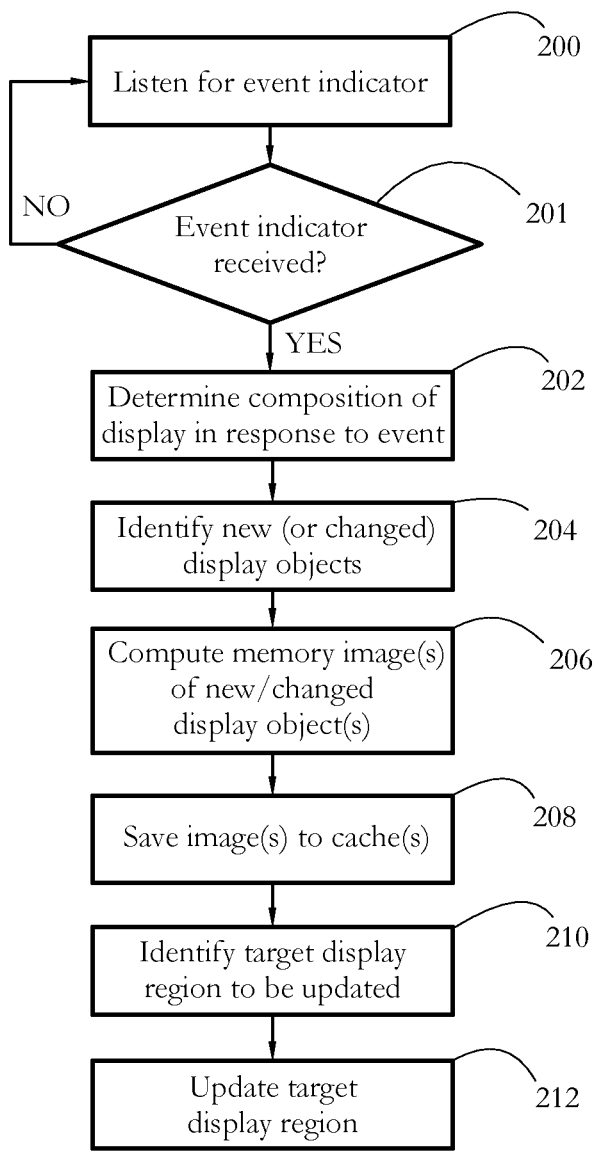
FIG. 7 shows an exemplary sequence of steps performed by a display refresh module of the smartwatch, according to some embodiments of the present invention.

FIG. 7 shows an exemplary sequence of steps performed by display refresh module 68 according to some embodiments of the present invention. In a sequence of steps 200-201, refresh module 68 receives an event indicator from event detector 66. A step 202 determines the composition of the display post-update, i.e., what the display should look like in response to the respective event. For instance, step 202 may identify a set of display objects and their position on screen. A step 204 may identify display objects that should be added to the screen in response to the event (herein termed new display objects), and/or a set of already displayed objects, whose appearance must change in response to the event (herein termed changed display objects). Exemplary ways in which a display object can change include, among others, a change of shape, a rotation, a change of transparency, and a change of color of the respective object.

For the new and/or changed display objects identified in step 204, in a sequence of steps 206-208, display refresh module 68 computes a memory image the respective display object and save the respective image to cache(s) 31. In one example, step 206 comprises computing a rotated image of a clock hand (see e.g., template element 26a in FIG. 2). In another example, step 206 comprises rendering the text of a message. The term memory image is herein used to denote an encoding of the respective display object. In a preferred embodiment, the memory image of a display object comprises a bitmap, i.e., a data structure comprising a plurality of values, wherein each value indicates a state of a distinct pixel of the respective display object. In some embodiments, step 208 saves an indicator of an on-screen position (e.g., a set of screen coordinates) of the respective display object together with the image data.

In a step 210, refresh module 68 determines a target display region affected by the screen update/refresh. Next, a step 212 updates the respective target region to generate the new image. Step 212 is further expanded in FIG. 8. In some embodiments, making new content visible on display 42 amounts to placing the new content into an image buffer, and transferring the content of the image buffer to display memory 44 of display 42. In some embodiments, the image buffer comprises a plurality of data fields, each field corresponding to a distinct pixel and configured to store a state of the respective pixel. The size (e.g., count of fields) of the image buffer is chosen so that its contents may be transferred to memory 44 in a single batch operation via display memory controller 36. In one example wherein the hardware of display 42 allows writing a line of pixels at a time, the size of the image buffer may be chosen to allow storage of data equivalent to a line of pixels. Other embodiments may allow writing several lines of pixels in one operation; for such embodiments, the display buffer may be configured to store at least the amount of data equivalent to the respective count of pixel lines. In some embodiments, the image buffer comprises a register of CPU 32 or a particular section of RAM 30; such a section may be a dedicated region of memory not available for other operations.

Figure 8:
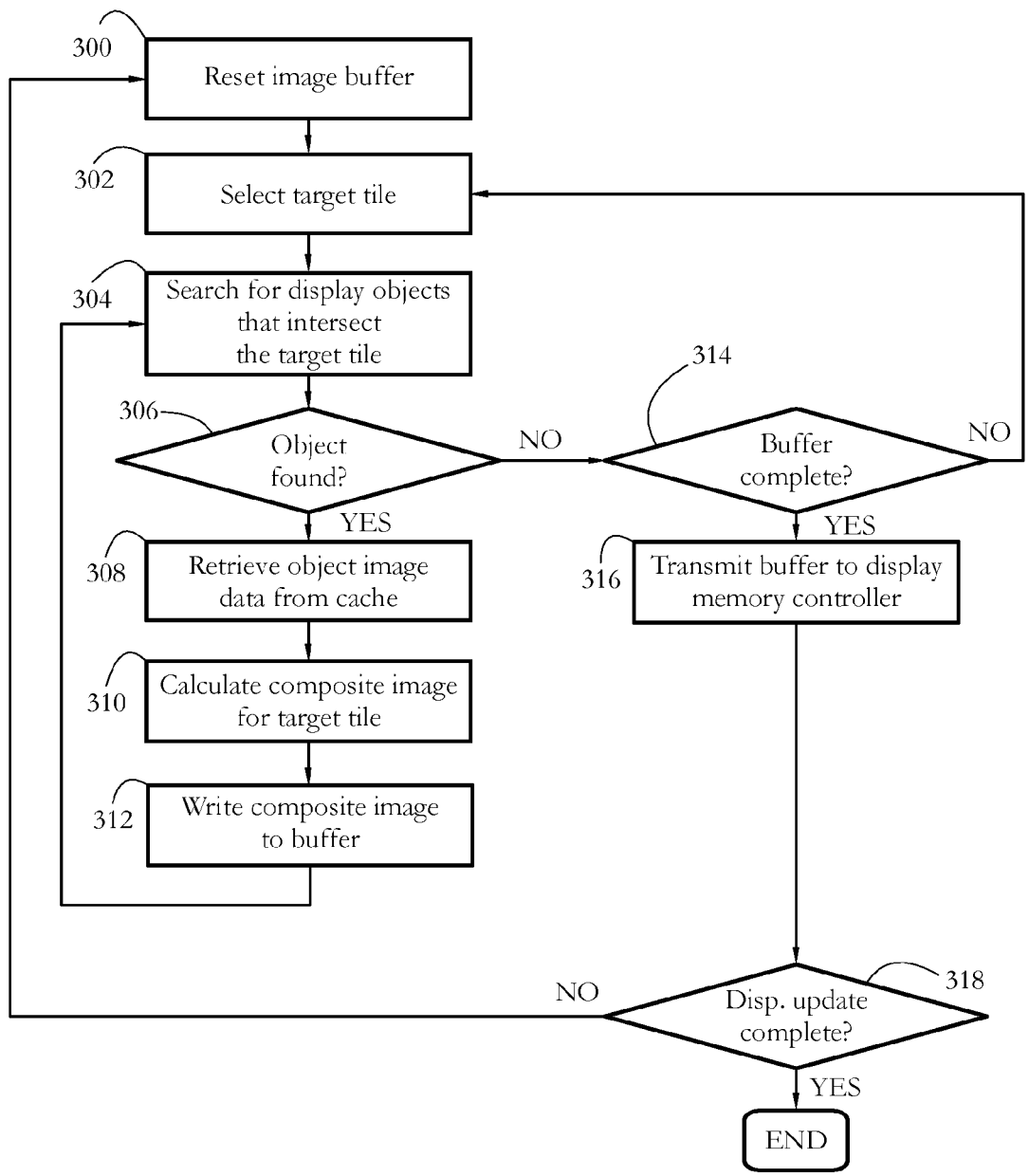
FIG. 8 shows an exemplary sequence of steps performed by the display refresh module of the smartwatch to update a target display region, according to some embodiments of the present invention.

In some embodiments, the steps illustrated in FIG. 8 are repeated in a loop, until all the affected target region of the screen has been updated/refreshed (in the example of FIG. 6, until all of target region 70 has been updated). Stated differently, the exemplary sequence of steps in FIG. 8 iteratively tiles the target region, until all the target region has been covered. A step 300 resets the image buffer. Next, in a step 302, display refresh module 68 may select a target tile of the display, the target tile comprising a subset of pixels of the target region, the size of tile (i.e., count of pixels) chosen to be less than or equal to the size of the image buffer. In an exemplary embodiment, the target tile consists of one line (row) of pixels of the target region. In another exemplary embodiment, the target tile consists of a single pixel of the target region.

A sequence of steps 304-312 is repeated in a loop for all display objects intersecting the target tile, i.e., for all objects displayed, at least in part, within the target tile. In FIG. 6, an exemplary target tile 72 intersects two display objects, clock hand 28b and cloud symbol 28c. A step 304 enumerates all display objects intersecting the target tile. When such an object is found, a step 308 retrieves image data of the respective object from image cache(s) 31. Step 308 may comprise selecting an individual image cache storing the image of the respective object, and retrieving from the appropriate cache the subset of image data corresponding to the target tile. In one example where cache 31 is embodied as a section of RAM 30, step 308 comprises determining the memory address where the respective image is stored, calculating an offset according to the target tile and to the screen position of the respective display object, and reading a sequence of bitmap values from the respective memory location.

A further step 310 calculates a composite image corresponding to the target tile, the composite image resulting from combining image data from multiple display objects that intersect the respective target tile. Next, a step 312 writes the respective composite image to the image buffer.

Figure 9:
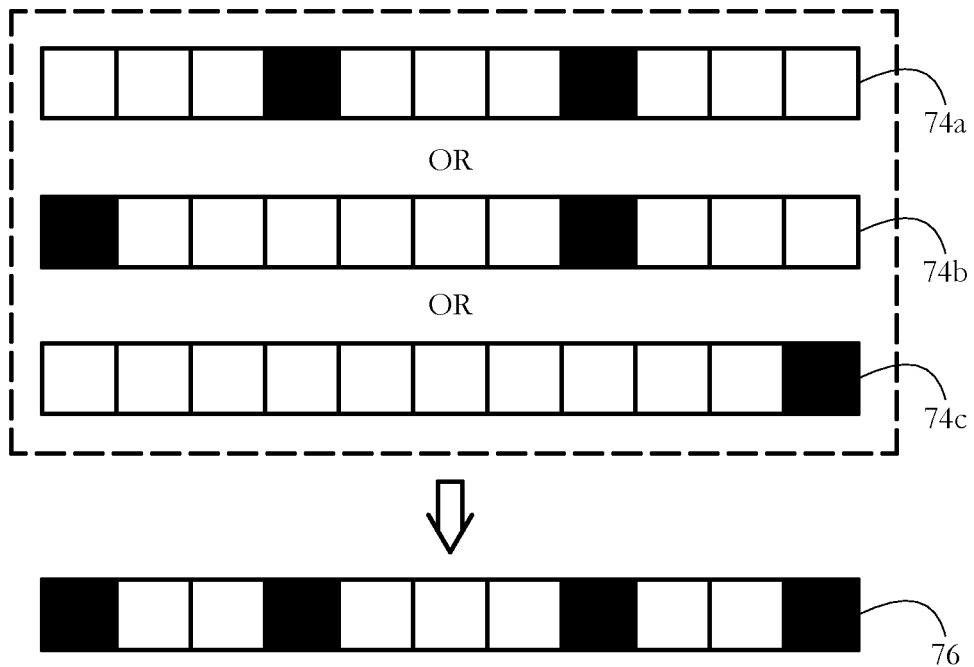
FIG. 9 illustrates exemplary logical layers of a display line and an exemplary line composition method, according to some embodiments of the present invention.
Figure 10:
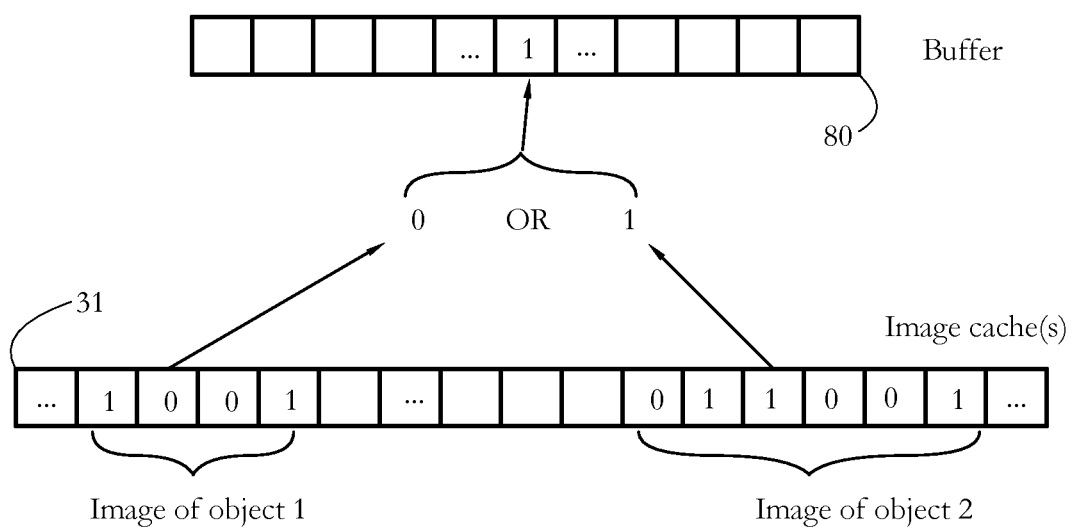
FIG. 10 illustrates assembling an image buffer from images of display objects stored in image cache(s) according to some embodiments of the present invention.

FIGS. 9-10 further illustrate combining multiple display objects to obtain a composite image according to some embodiments of the present invention. Without loss of generality, FIGS. 9-10 show an embodiment wherein each pixel of display 42 can be either on or off (e.g. black or white, 1 bit/pixel display). This choice of illustration was made solely for the purpose of clarity. A skilled artisan will appreciate that the illustrated systems and methods can be adapted to digital displays having more than one bit per pixel, for instance to gray scale and/or RGB displays.

In some embodiments, the image displayed to the user is multi-layered, in the sense that some display objects such as clock hands and various other symbols may overlap, at least in part. When several objects overlap, the composite image computed in step 310 comprises an image that results from overlapping the respective display objects. FIG. 9 shows a composite image 76 computed from a set of three overlapping image layers 74*a-c* according to some embodiments of the present invention. Each layer 74*a-c* may comprise a distinct display object. For instance, layer 74*a* may contain a part of minute hand 28*b* (FIG. 6), while layer 74*c* may contain a part of weather symbol 28*c*. Placing layer 74*a* above layer 74*b* may ensure that the clock hand is displayed on top of, and may occasionally obscure parts of, the weather symbol.

In some embodiments, computing the composite image (step 310) comprises determining a result of applying a logical operation to the set of overlapping image layers. In the example of FIG. 9, composite image 76 is the result of a pixel-wise OR applied to layers 74*a-c*. More complicated processing (e.g., complex logical operations) may be used in the case of gray scale/color displays, or to obtain transparency effects.

Computing the composite image is further illustrated in FIG. 10. Step 308 (FIG. 8) comprises retrieving from cache 31 a memory image of each object that intersects the target set of pixels. In the illustration of FIG. 10, the memory images of two display objects are aligned according to the on-screen position of each object. The two memory images are then combined using OR to produce a composite image that is subsequently written to buffer 80.

When all display objects intersecting the target set of pixels have been processed according to steps 304-312, a step 314 tests whether the buffer is full. When no, display refresh module 68 returns to step 302 described above, to select another set of pixels (target tile) from the target region. When the image buffer is full, in a step 316, module 68 may transmit the contents of the image buffer to display memory controller 36 for writing to display memory 44. Step 316 may further comprise transmitting an indicator of a location on screen (e.g., a set of screen coordinates, a set of line numbers, etc.) where the content of the buffer will be displayed. A step 318 checks whether the display update is complete, e.g., whether all of the target display region has been updated/refreshed. When no, display refresh module 68 returns to step 300, to reset the image buffer.

Some embodiments speed up the display update/refresh process by exploiting the capability of display memory controller 36 to access display memory 44 independently of CPU 32. In one such embodiment wherein controller 36 has direct memory access (DMA) capabilities, calculating the composite image and writing the image to display memory 44 is carried out concurrently, in parallel. For instance, while controller 36 transfers the contents of a line of pixels to memory 44, display refresh module 68 calculates the content of the next line of pixels. Module 68 will then wait for the DMA transfer to finish, before sending the contents of the newly calculated line of pixels to controller 36.

The exemplary systems and methods described above allow minimizing energy use and increasing battery life of a wearable device such as a smartwatch, by optimizing the way an image displayed by the device is updated in response to an event. Events that may trigger image updates include, among others, timekeeping events, user events (e.g., the user's pressing a button), and communication events (e.g., receiving a notification). In response to the occurrence of such an event, the display will change. Exemplary display updates include moving a clock hand, switching to another application mode (e.g., calendar mode, messaging mode), displaying notifications, etc.

In conventional display management, a snapshot of the entire image currently shown on screen is typically stored in a memory, such as a section of RAM. Transferring the contents of the respective section to the display memory effectively displays the image on screen. In order to make changes to the on-screen image, software typically writes the changes to the section of memory, and then transfers the new image to the screen. When the image is multi-layered, in the sense that a first object may obscure parts of a second object, updating the image and/or position of the first object automatically overwrites parts of the image of the second object. In one such example, in order to move a target object on screen (e.g., in animation effects) the target object is deleted from the current location, and the objects that were obscured at least in part by the target object are redrawn. Then the target object is drawn at the new location. This operation forces a multitude of objects to be re-drawn (i.e., re-calculated) every time an object changes appearance and/or position. Conventional systems typically do not store separate images of objects appearing on screen; the screen snapshot only comprises a single composite image resulting by combining all the respective objects.

In contrast, some embodiments of the present invention store each individual display object separately, in an image cache, e.g., in a separate section of memory. Examples of display objects include, among others, a clock hand, a text object, and an instance of a graphical symbol/icon representing a weather, fitness, or calendar event. When an event triggers an update of the screen, some embodiments of the present invention determine which display objects are affected by the update, generate an (updated) image of each affected object, and save the respective images to the image cache. Then, the region of the display affected by the update is composed, dynamically, from the cached images of individual objects. Some embodiments use a buffer to compose a subset of pixels (e.g., a tile, a full display line), and alternate between writing the contents of the buffer to the display memory and composing the next subset of pixels, until all of the display region affected by the update has been drawn. When several display objects intersect, some embodiments compute the composite image via a logical operation (e.g., pixel-wise OR) applied to all overlapping display objects.

The exemplary systems and methods described above may use substantially less energy than conventional display update systems and methods. Storing each display object separately in a cache allows some embodiments of the present invention to avoid unnecessary calculations. Image rendering is relatively costly in terms of computation, and some embodiments replace a substantial fraction of this effort with much less expensive memory access operations. Typically, only a small subset of the display objects change in response to a refresh event. Caching images of individual objects allows some embodiments to calculate/draw only those objects whose appearance changes in response to an event, while unchanged objects are simply retrieved from the cache. In the example of an analog clock face, the image of the second hand changes (rotates) every second, but the images of the minute and hour hands change much less often. Therefore, to advance the second hand, some embodiments only re-calculate the image of the second hand, and re-compose it with cached images of the minute and hour hands.

Another exemplary situation that brings substantial energy savings when compared to conventional display management systems is translational animation of display objects (i.e., animation that does not involve rotation, stretching, etc.). Such animations often accompany a switch between two modes of operation, for instance between displaying a clock face and displaying a calendar. When the animation only comprises changing the on-screen location of a target object, the image of the respective object does not need to be recalculated. Some embodiments use the cached image of the target object throughout the animation.

It will be clear to a skilled artisan that the above embodiments may be altered in many ways without departing from the scope of the invention. Accordingly, the scope of the invention should be determined by the following claims and their legal equivalents.

What is claimed is:

1. A wearable computing device, comprising:
   one or more processors;
   a memory; and
   a display with a display memory, an image buffer, and an image cache,
   wherein the memory stores computer-executable instructions for causing the one or more processors to:
      identify one or more display objects that will change responsive to an event;
      determine a target region of the display that will change responsive to the changes in the one or more display objects;
      subdivide the target region into a plurality of target tiles, each target tile having a corresponding pixel count that is less than or equal to a size of the image buffer; and, for each target tile:
         a) determine a subset of the one or more display objects, wherein each display object in the subset of the one or more display objects intersects with target tile,
         b) retrieve, from the image cache and for each of the one or more display objects in the subset of the one or more display objects that intersects with that target tile, a subset of image data that intersects with that target tile and is associated with that display object,
         c) determine composite image data for that target tile, the composite image data based at least on a combination of the subsets of image data for the one or more display objects in the subset of the one or more display objects that intersects with that target tile, and
         d) write the composite image data for that target tile to the image buffer;
      determine that the image buffer is full; and
      write, based at least on the image buffer being full, the composite image data from the image buffer to the display memory.

2. The wearable computing device of claim 1, wherein:
   the image cache stores image data for a plurality of images,
   the image data includes first image data for a first image,
   each image of the plurality of images comprises a rendering of one of the display objects,
   the first image data comprises a first set of values,
   each value of the first set of values is indicative of a state of a pixel of a first display object of the plurality of display objects, and
   the memory further stores computer-executable instructions for causing the one or more processors to:
      compute second image data for a second image, the second image data comprising a second set of values, each value of the second set of values indicative of a state of a pixel of a second display object of the plurality of display objects; and
      store the second image in the image cache after computing the second image data, wherein for at least one of the target tiles:
         the first display object and the second display object intersect with that target tile, and
         the composite image data for that target tile is calculated by at least combining the subset of the first image data that intersects with that target tile with the subset of the second image data that intersects with that target tile by applying a pixel-wise logical operator to the first and second sets of values within the subsets of the first and second image data, respectively.

3. The wearable computing device of claim 2, wherein the second display object is an instance of the first display object after undergoing a change selected from the group consisting of: a change of shape, a change of rotational orientation, a change in transparency, and a change in color.

4. The wearable computing device of claim 2, wherein the first display object is selected from a group of objects consisting of: a clock hand, a weather symbol, a fitness symbol, and an alphanumeric character.

5. The wearable computing device of claim 1, wherein each target tile is a row of pixels.

6. The wearable computing device of claim 1, wherein the image cache comprises a register of the one or more processors.

7. The wearable computing device of claim 1, wherein the image cache comprises a section of the memory of the wearable computing device.

8. The wearable computing device of claim 1, wherein the event is selected from a group of events consisting of: receiving a communication from another device distinct from the wearable computing device, an action of a user of the wearable computing device, and a fulfillment of a time condition.

9. The wearable computing device of claim 1, wherein the wearable computing device is a wristwatch.

10. A method comprising:
    causing one or more processors of a wearable computing device to identify one or more display objects displayed on a display of the wearable computing device that will change responsive to an event;
    causing the one or more processors of the wearable computing device to determine a target region of the display that will change responsive to the changes in the one or more display objects;
    causing the one or more processors of the wearable computing device to subdivide the target region into a plurality of target tiles, each target tile having a corresponding pixel count that is less than or equal to a size of an image buffer of the wearable computing device; and, for each target tile:
       a) determine a subset of the one or more display objects, wherein each display object in the subset of the one or more display objects intersects with that target tile, b) retrieve, from an image cache of the wearable computing device and for each of the one or more display objects in the subset of the one or more display objects that intersects with that target tile, a subset of image data that intersects with that target tile and is associated with that display object, c) determine composite image data for that target tile, the composite image data based at least on a combination of the subsets of image data for the one or more display objects in the subset of the one or more display objects that intersects with that target tile, and d) write the composite image data for that target tile to the image buffer;

causing the one or more processors of the wearable computing device to determine that the image buffer is full; and causing the one or more processors of the wearable computing device to write, based at least on the image buffer being full, the composite image data from the image buffer to a display memory of the wearable computing device.

11. The method of claim 10, wherein the image cache stores image data for a plurality of images, the image data includes first image data for a first image, each image of the plurality of images comprises a rendering of one of the display objects, the first image data comprises a first set of values, and each value of the first set of values is indicative of a state of a pixel of a first display object of the plurality of display objects, the method further comprising causing, responsive to detecting the occurrence of the event, the one or more processors of the wearable computing device to:

compute second image data for a second image, the second image data comprising a second set of values, each value of the second set of values indicative of a state of a pixel of a second display object of the plurality of display objects;

calculate the composite image data for each target tile by apply a pixel-wise logical operator to the first and second sets of values in the subsets of image data that intersect with each target tile; and transmit the composite image to a display of the wearable computing device.

12. The method of claim 11, wherein the second display object is an instance of the first display object after undergoing a change selected from the group consisting of: a change of shape, a change of rotational orientation, a change in transparency, and a change in color.

13. The method of claim 11, wherein the first display object is selected from a group of objects consisting of: a clock hand, a weather symbol, a fitness symbol, and an alphanumeric symbol.

14. The method of claim 10, wherein each target tile is a row of pixels.

15. The method of claim 10; wherein the image cache comprises a register of the one or more processors.

16. The method of claim 10, wherein the image cache comprises a section of a memory of the wearable computing device.

17. The method of claim 10, wherein the event is selected from a group of events consisting of: receiving a communication from another device distinct from the wearable computing device, an action of a user of the wearable computing device, and a fulfillment of a time condition.

18. The method of claim 10, wherein the wearable computing device is a wristwatch.

19. A non-transitory computer readable medium storing instructions which, when executed by one or more processors of a wearable computing device, cause the one or more processors of the wearable computing device to:

identify one or more display objects displayed on a display of the wearable computing device that will change responsive to an event;

determine a target region of the display that will change responsive to the changes in the one or more display objects;

subdivide the target region into a plurality of target tiles, each target tile having a corresponding pixel count that is less than or equal to a size of an image buffer of the wearable computing device; and, for each target tile:

a) determine a subset of the one or more display objects, wherein each display object in the subset of the one or more display objects intersects with that target tile, b) retrieve, from an image cache of the wearable computing device and for each of the one or more display objects in the subset of the one or more display objects that intersects with that target tile, a subset of image data that intersects with that target tile and is associated with that display object, c) determine composite image data for that target tile, the composite image data based at least on a combination of the subsets of image data for the one or more display objects in the subset of the one or more display objects that intersects with that target tile, and d) write the composite image data for that target tile to the image buffer;

determine that the image buffer is full; and write, based at least on the image buffer being full, the composite image data from the image buffer to a display memory of the wearable computing device.

20. The non-transitory computer readable medium of claim 19, storing further instructions which, when executed, cause the one or more processors of the wearable computing device to:

retrieve a first set of values from an image cache of the wearable computing device, wherein the image cache stores image data for a plurality of images, the image data includes first image data for a first image, each image of the plurality of images comprises a rendering of one of the display objects, the first image data comprises the first set of values, and each value of the first set of values is indicative of a state of a pixel of a first display object of the plurality of display objects, compute image data for a second image, the second image data comprising a second set of values, each value of the second set of values indicative of a state of a pixel of a second display object of the plurality of display objects;

apply a pixel-wise logical operator to the first and second sets of values in the subsets of image data that intersect with each target tile; and transmit the composite image to a display of the wearable computing device.

* * * * *